United States Patent
Barajas Gonzalez et al.

(10) Patent No.: US 9,934,232 B2
(45) Date of Patent: Apr. 3, 2018

(54) DATA RESTRUCTURING OF DEDUPLICATED DATA

(71) Applicant: INTERNATIONAL BUSINESS MACHINES CORPORATION, Armonk, NY (US)

(72) Inventors: Emmanuel Barajas Gonzalez, El Salto (MX); Shaun E. Harrington, Sahuarita, AZ (US); Harry McGregor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 609 days.

(21) Appl. No.: 14/303,708

(22) Filed: Jun. 13, 2014

(65) Prior Publication Data

US 2015/0363418 A1    Dec. 17, 2015

(51) Int. Cl.
*G06F 17/30*    (2006.01)

(52) U.S. Cl.
CPC .. *G06F 17/30135* (2013.01); *G06F 17/30159* (2013.01)

(58) Field of Classification Search
CPC ....... G06F 3/067; G06F 3/0611; G06F 3/0685
USPC ........... 718/1, 105, 101, 104; 707/694, 737, 707/E17.017, 769, 798, 809, E17.009, 707/E17.037, E17.044, E17.056, E17.127, 707/601, 634, 678, 687, 690, 713, 714, 707/736, 741, 748, 752, 802, 803, 822, 707/828, 829, 999.005, 999.01, 999.102, 707/999.103; 709/223, 226, 219, 221, 709/224, 212

See application file for complete search history.

(56) References Cited

U.S. PATENT DOCUMENTS

| | | | |
|---|---|---|---|
| 6,324,620 B1 * | 11/2001 | Christenson | G06F 3/061 710/74 |
| 8,046,551 B1 * | 10/2011 | Sahin | G06F 11/2074 711/162 |
| 8,280,854 B1 | 10/2012 | Emmert | |
| 8,340,039 B2 | 12/2012 | Akirav et al. | |
| 8,498,966 B1 * | 7/2013 | Waghole | G06F 11/1461 707/645 |
| 9,330,009 B1 * | 5/2016 | Throop | G06F 12/0866 |
| 2011/0010514 A1 * | 1/2011 | Benhase | G06F 3/061 711/162 |
| 2012/0317337 A1 * | 12/2012 | Johar | G06F 12/0246 711/103 |
| 2014/0250281 A1 * | 9/2014 | Rao | G06F 12/0223 711/156 |

OTHER PUBLICATIONS

Seem Kishore ("Should You defrag an SSD"; http://helpdeskgeek.com/featured-posts/should-you-defrag-an-ssd/; published May 6, 2012).*

(Continued)

*Primary Examiner* — Jay A Morrison
*Assistant Examiner* — Ken Hoang
(74) *Attorney, Agent, or Firm* — Griffiths & Seaton PLLC

(57) ABSTRACT

Various embodiments for enhancing storage of deduplicated data in a computing storage environment. Analytics are applied to at least one data storage characteristic observed in the computing storage environment to restructure the deduplicated data in a more sequential manner so as to enhance performance of the computing storage environment.

18 Claims, 4 Drawing Sheets

(56) References Cited

OTHER PUBLICATIONS

"LinkIntegrity+: A Web Asset Integrity Solution" pp. 582-590, Proceeding of the 2nd International Conference on Computing (IC 2001).

* cited by examiner

DATA RESTRUCTURING OF DEDUPLICATED DATA

BACKGROUND OF THE INVENTION

Field of the Invention

The present invention relates in general computing systems, and more particularly to, various embodiments for restructuring deduplicated data to enhance efficiency in computing storage environments.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various deduplication techniques may be used to deduplicate files. For example, the file may be analyzed against an additional file to determine if the file has the same size, name, and contents when analyzed at the block-by-block level. Deduplication technology allows, at a high level, the elimination of duplicate information in storage environments, such that the storage held by the duplicate information is then released, opening up potentially significant amounts of additional storage space in the computing storage environment.

While data deduplication conveys significant benefits, it also may bestow certain challenges to storage environments. When data is typically written to a storage device and is not deduplicated, the data is written sequentially. Deduplicated data, however, by its nature is not written sequentially. Instead, pointers, for example, are written in the data to the retained duplicate information. Data that has been heavily deduplicated may then contain information that is essentially not sequential, requiring the storage device to expend additional resources finding, accessing, and reading the information, for example. As a result, the benefits provided by deduplication may be reduced by, or exceeded by, the effects such deduplication has on the performance of the storage environment.

In view of the foregoing, a need exists for mechanisms whereby data deduplication technology conveys benefits upon a storage environment without the attendant resulting challenges described previously.

Accordingly, various embodiments for enhancing storage of deduplication in a computing storage environment are provided. In one embodiment, by way of example only, a method for enhancing such storage of deduplication data by a processor device in a computing storage environment is provided. Analytics are applied to at least one data storage characteristic observed in the computing storage environment to restructure the deduplicated data in a more sequential manner so as to enhance performance of the computing storage environment.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
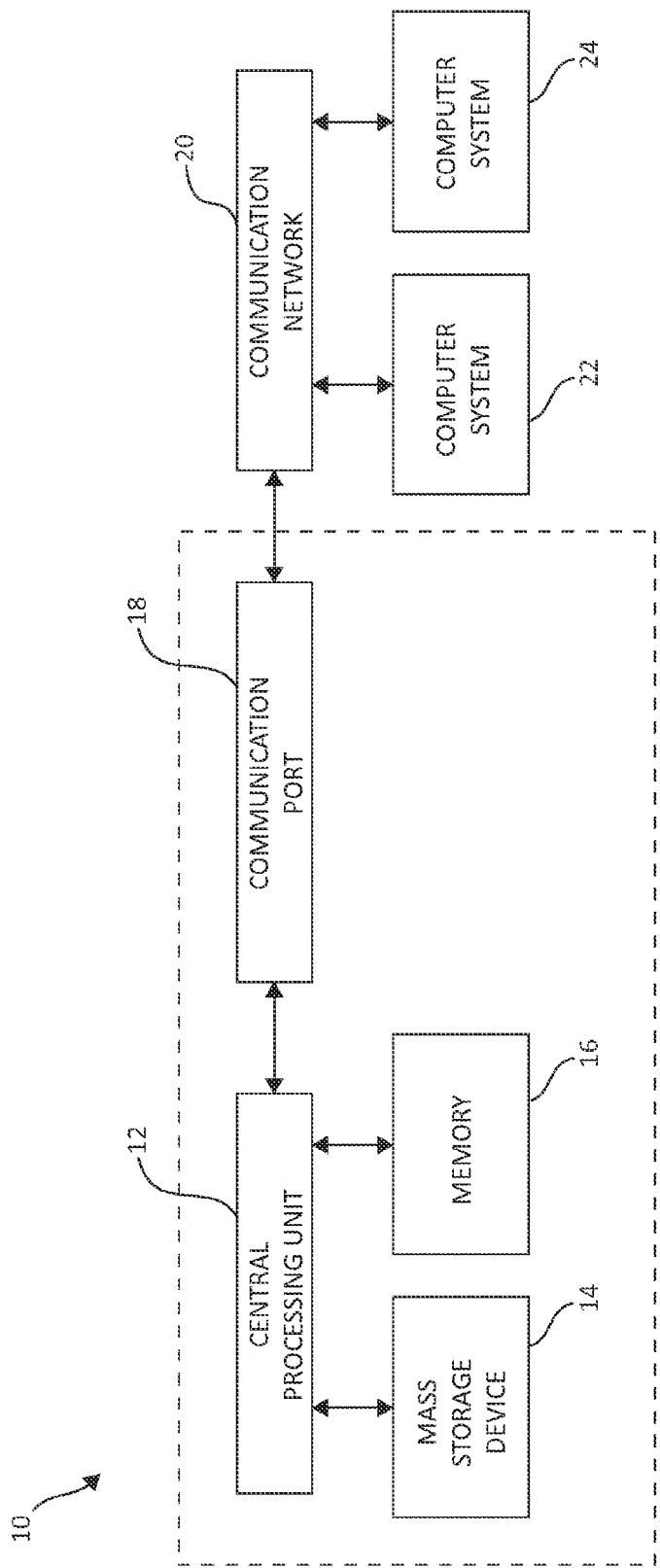
FIG. 1 is an exemplary block diagram showing a hardware structure for performing data deduplication and data management functionality, in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

The increased resources, by way of processors and memory, have allowed for data deduplication to actually occur at real time as the data is being written. In essence, the user does not have to perform any special activity for the deduplication to occur. The user simply operates their machine as the user typically would, and the device running the deduplication engine handles the deduplication tasks quietly and efficiently.

However, while deduplication functionality in storage environments is indeed an amazing benefit to the sheer storage space now available to the user, there is also a trade off. When data is written to a storage device, and it is not being de-duplicated, it is written in a sequential fashion. In other words, if a user has a file that consists of 20 bytes, byte 2 will follow byte 1, byte 3 will follow byte 2 and so on. This allows the storage to have a relatively low seek time when it comes to finding each piece of data requested of it by the user. The storage device can simply act in a sequential order and piece by piece read the data from the drive as it is listed. In contrast, when data is deduplicated, it is deduplicated at a block level (block size defined by the product) that consists of a collection of bytes. These bytes are then compared to bytes they have already seen, and if a match is found a place holder is put in place of the block to tell it to look over their when needing that block. While placeholders are efficient for the storage space and also for the real time deduplication (i.e., much easier to write a pointer than write a file to the disk), use of pointers and other placeholders also virtually guarantees that the data being written while being broken up is not sequential.

For example, in order to read the same above referenced 20 byte file, bytes 1-5 may be a part of block A at one point on the storage while 6-10 may be a part of block B at the complete opposite end. This produces a high workload on the storage device, requiring the device to continually seek the data in different locations, and prevents the device from consistently reading information that has been written.

These seek time issues are typically reserved for mechanical drives only; however, the high cost of solid-state drives tends to weigh heavily on the user and thus makes them a rare solution. While data deduplication has increased the storage capacity phenomenally, it has not been without a trade off; the lack of sequential data bares a heavy burden on the storage's actual data read speed times and often can cause issues within an environment, or at a minimum, create slowdowns.

The mechanisms of the illustrated embodiments serve to address the tradeoff previously mentioned by deduplicating data resulting in non-sequentiality, by using a variety of analytics and read pattern recognition to rearrange the deduplicated data into a pattern that is more sequential based on the read profiles in use with the stored, deduplicated data. These mechanisms assess, for example, based on read frequency, the ideal location for physical data versus a current data location. When data reads reach a certain threshold, for example, the data reads may be compared to other thresholds already met that are matching that data, an optimal layout may be implemented.

In addition to analyzing the data against thresholds, combined patterns may also be taken into account by way of large block read analyses. Careful consideration may also be made to reduce disk thrashing by changing the layout too frequently, which would limit the effectiveness of the mechanisms of the present invention. Finally, a detection of an underlying disk type may be implemented in one embodiment, which provides that solid state drives are not monitored and effected by the mechanisms of the illustrated embodiments.

In one embodiment, the mechanisms of the present invention may implement various functionality based upon analytics such as read pattern detection, data movement, block movement and block count, and disk thrashing detection (e.g., how many Input/Output operations per second (IOPs) are being used in moving data versus the actual read requests).

In reference to read pattern detection functionality discussed above, certain mechanisms may be implemented that hold a table with entries produced for each read request. These entries may include starting and ending Logical Block Address (LBA) of the read operation. Sub-read request patterns may be determined based on inclusion within the starting and ending LBA of the read operation, while larger read operations may take precedence within the table; with the previous stored values becoming sub-read records under the new, larger read operation. An additional aspect of the table may include an ability to track read operations over time intervals, such as per hour, to facilitate an optimization algorithm. Optionally, the read pattern detection table may be pruned due to either size constraints or age of the last read detected.

In reference to the data movement functionality previously indicated, certain mechanisms may be implemented that perform data analytics to analyze information in the read pattern detection table to determine an effective data layout on the disk. This may be accomplished by serializing data for enhanced sequential reads of frequently accessed data. Thresholds for movement may, in one embodiment, be based on a combination of prospective performance improvement, in addition to information in a block move count table to ensure that a move or additional move is warranted.

In reference to the block move count functionality previously indicated, certain mechanisms may be implemented that, to ensure that an implemented data movement mechanism is effective, stores in a table both the original LBA range and a new LBA range corresponding to when the data was moved, and how frequently the data is moved. This information may be used with the data movement mechanism to reduce unnecessary data movement.

Finally, in reference to the disk thrashing reduction functionality previously indicated, certain mechanisms may be implemented which, in one embodiment, track a combination of read and write throughput as well as disk subsystem latency. These mechanisms may be used to prevent the data movement mechanisms from adversely impacting performance of the deduplication and overall storage environment. Additionally, these mechanisms may enforce configurable thresholds pertaining to how much performance the data movement mechanisms may utilize. These mechanisms may also permit configurable time windows for when the data movement mechanisms operate, for example, in cases where optimization functionality should only be implemented during certain predefined periods of time, as one of ordinary skill in the art will appreciate.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
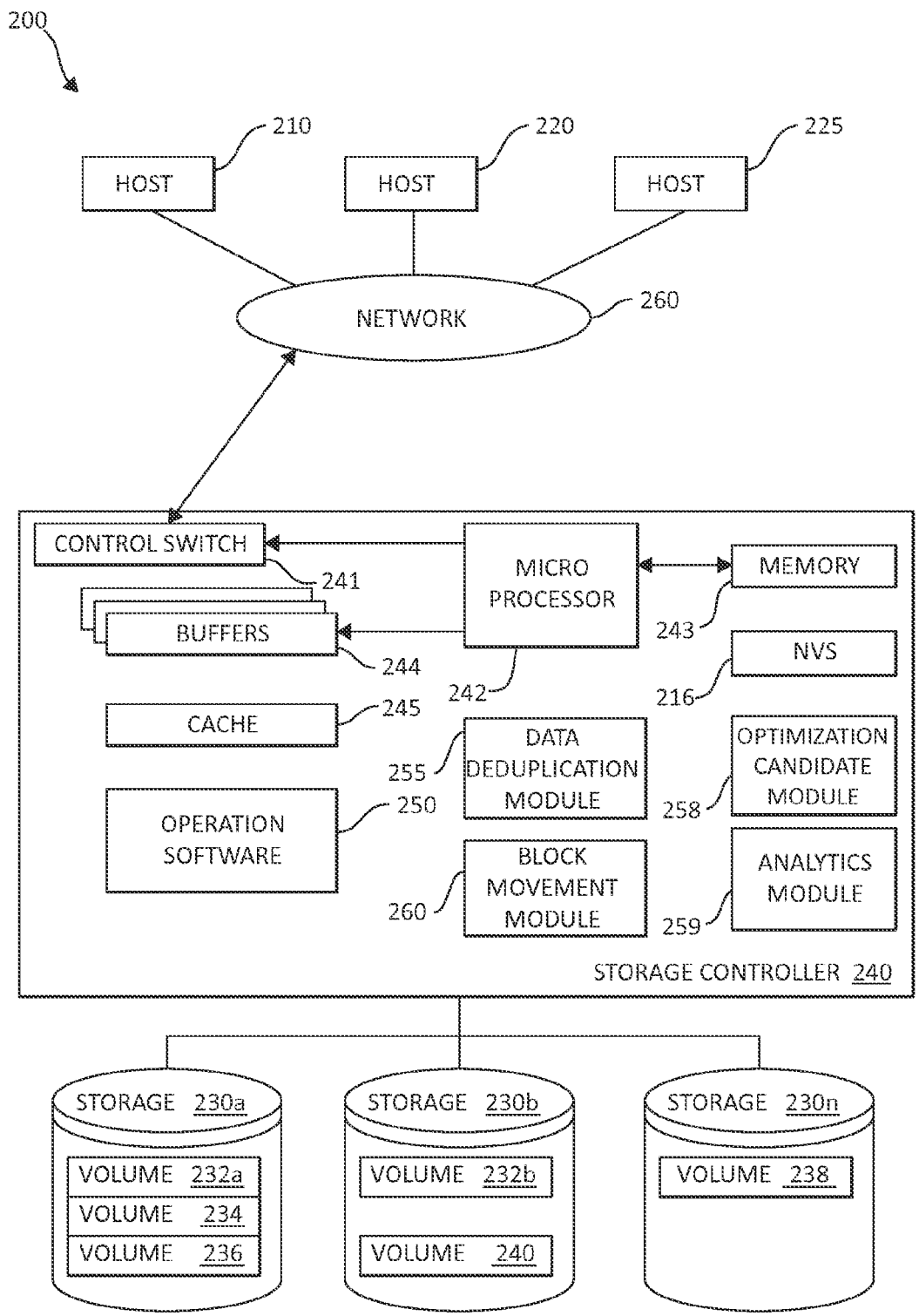
FIG. 2 is an exemplary block diagram showing a hardware structure of a data storage system in a computer system according to the present invention in which aspects of the present invention may be realized.

FIG. 2 is an exemplary block diagram 200 showing a hardware structure of a data storage and deduplication system that may be used in the overall context of performing video deduplication functionality. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the video deduplication functionality according to aspects of the illustrated embodiments. Moreover, it should be noted that particular deduplication system hardware and software may be useful in one embodiment, and thereby selected by one of ordinary skill in the art, where the recognition of two video streams having individual (differing) encoding codecs as the same video is desired.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, an optimization candidate module 258, an analytics module 259, and a block movement module 260. The data deduplication module 255, the optimization candidate module 258, the analytics module 259, and the block movement module 260 may operate in conjunction with each and every component of the storage controller 240, the hosts 210, 220, 225, and storage devices 230. The data deduplication module 255, the optimization candidate module 258, the analytics module 259, and the block movement module 260 may be structurally one complete module or may be associated and/or included with other individual modules. The data deduplication module 255, the optimization candidate module 258, the analytics module 259, and the block movement module 260 may also be located in the cache 245 or other components.

The data deduplication module 255, the optimization candidate module 258, the analytics module 259, and the block movement module 260 may individually and/or collectively perform various aspects of the present invention as will be further described. For example, the data deduplication module 255 may perform various data deduplication tasks such as file deletion or joining together file segments by creating placeholders in the data as previously described. The optimization candidate module 258 may work in conjunction with the analytics module 259 and block movement module 260 to implement a data movement plan for certain data in accordance with the analysis performed by the analytics module. The analytics module 259 may apply analytics to the various deduplicated data to identify optimization candidates. Finally, the block movement module 260 may move identified optimization candidates (blocks) to new storage locations that are generally more sequentially ordered.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
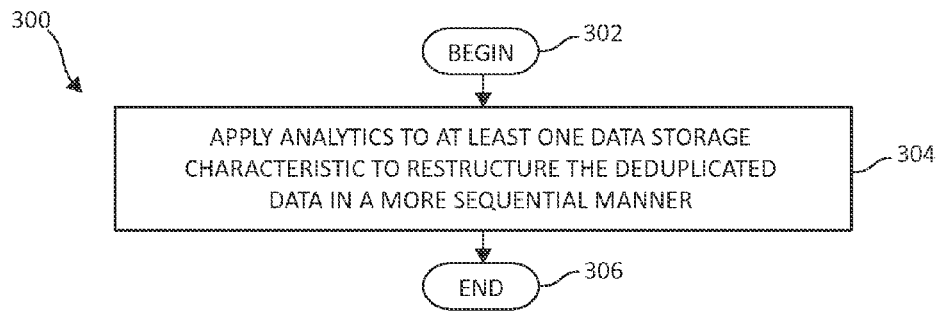
FIG. 3 is a flow chart diagram illustrating an exemplary method for enhancing storage of deduplicated data, again in which aspects of the present invention may be realized.

Turning now to FIG. 3, a flow chart diagram, illustrating an exemplary method 300 for efficiently enhancing storage of deduplicated data, is depicted. Method 300 begins (step 302). Analytics are applied to at least one data storage characteristic to restructure the deduplicated data in a more sequential manner (step 304). The data storage characteristics may, as one of ordinary skill in the art will appreciate, vary in terms of function, how measured, how applied, a particular implementation, constraints (i.e., resource constraints), time of day, and the like. For example, the storage characteristic may include block and read pattern information, or time-stamp information as will be further described. As previously described, the data storage characteristics in which the analytics are applied to may include read patterns, data movement, block move and count, and read and write throughput as well as disk subsystem latency characteristics. The method 300 then ends (step 306).

Figure 4:
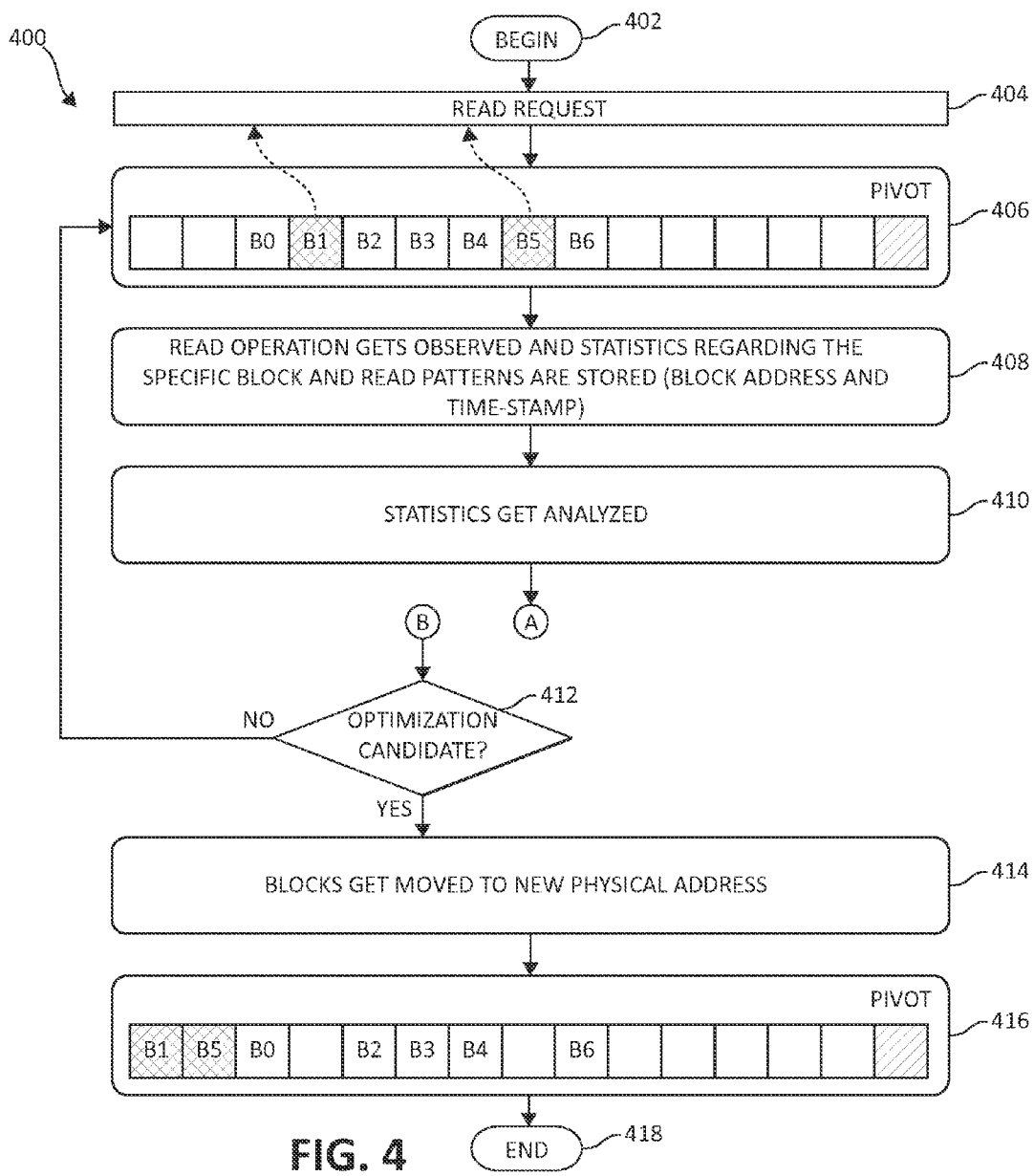
FIG. 4 is an additional flow chart diagram illustrating an additional exemplary method for enhancing storage of deduplicated data, again in which aspects of the present invention may be implemented.

FIG. 4, following, is an additional flow chart diagram depicting an exemplary method 400 for enhancing storage of deduplicated data (by, for example, rearranging the deduplicated data in a more sequential manner by using various data analytics) in accordance with various aspects of the illustrated embodiments. Method 400 begins (step 402) with a read request for data in the storage environment (step 404). In the illustrated embodiment, blocks b1 and b5 are requested to be read as indicated by block illustration 406.

In a subsequent step, the read operation is observed, and statistics regarding the specific block and read patterns are stored, such as a block address and associated time stamp (step 408). The statistics are then analyzed in more detail 410, as noted by (A), which continues method 400 to method 500 in FIG. 5, following.

Figure 5:
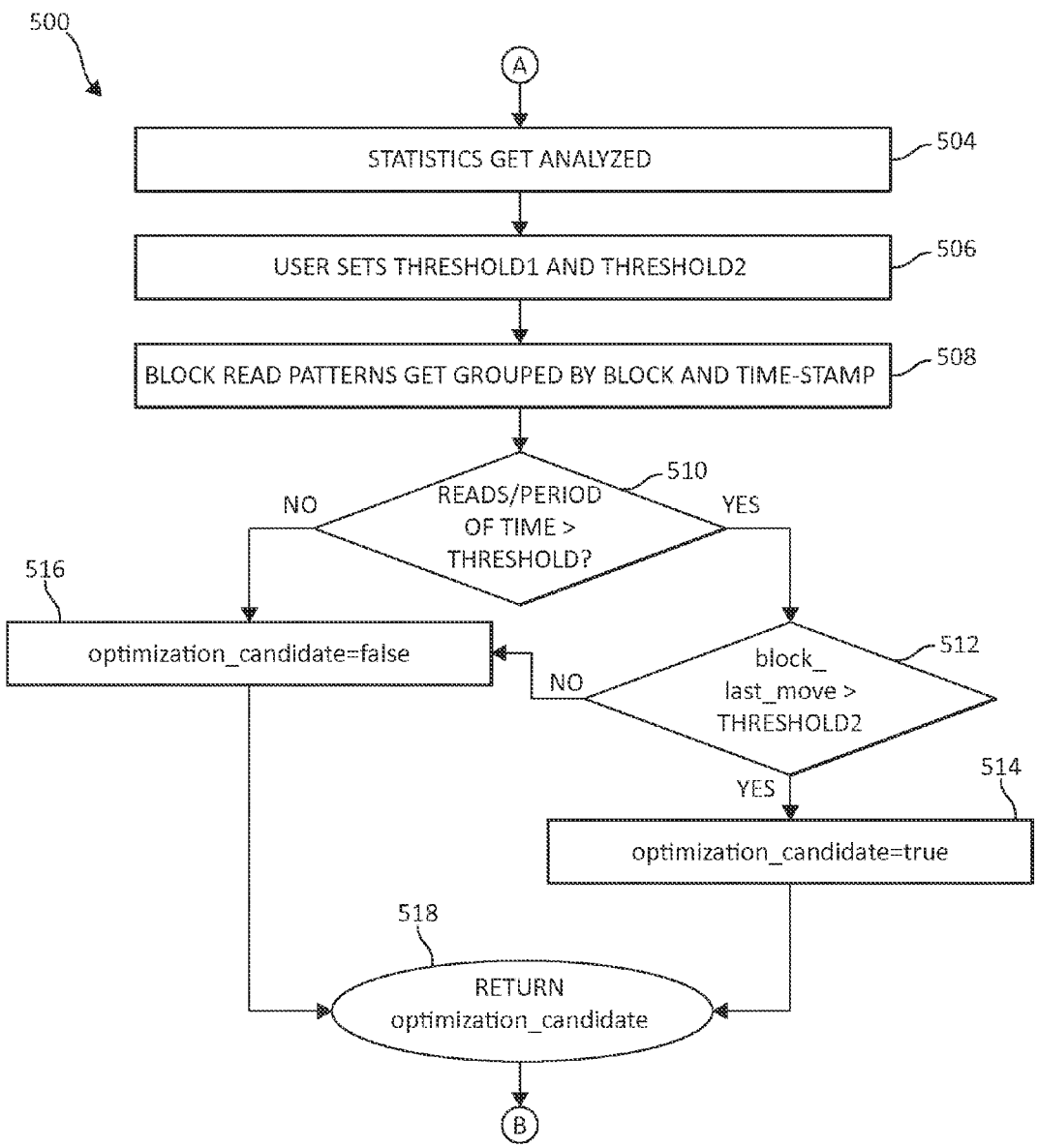
FIG. 5 is an additional flow chart diagram illustrating continuing exemplary functionality for enhancing storage of deduplicated data of the method first described in FIG. 4, previously, here again in which aspects of the present invention may be implemented.

Following (A) to FIG. 5 and method 500, where the various read operation-related statistics are analyzed (step 504), the user (in one embodiment, previous to the instant analysis) has set a threshold1 and threshold2 thresholds (step 506). Threshold1 may be a function of the read frequency (e.g., number of read operations conducted per a period of time), for example. Threshold2 may indicate how much time should pass before a particular block is again moveable in the system, for example. As one of ordinary skill in the art will appreciate, the thresholds implemented in a specific embodiment may vary in degree and type, depending on a variety of factors.

In step 508, following, the block read patterns are grouped by block and time-stamp. The method 500 then queries if the reads/period of time exceed the threshold1 threshold (step 510). If no, the optimization candidate is returned as false (e.g., an optimization candidate is not identified) (step 516). Returning to step 510, if the threshold1 is exceeded by the reads/period of time, the method 510 moves to decision step 512, which queries whether the particular block(s) were previously moved at an elapsed time greater than the threshold2 time. If no, the method 500 moves again to step 516 as previously described. If yes, the optimization candidate is returned as true (e.g., an optimization candidate is identified). The result of the exemplary analysis in method 500 is then returned to method 400 in step 518 as shown, and (B), returns to (B) in FIG. 4, previously.

Returning to FIG. 4, (B) returns to method 400 at decision step 412, which queries whether optimization candidate block(s) have been identified. If no, the method 400 returns to step 404 as previously described. If yes, the block(s) are moved to the new physical address (step 414) as shown graphically by illustration 416, depicting blocks B1 and B5 written in sequential order. The method 400 then ends (step 418).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for enhancing storage of deduplicated data by a processor device in a computing storage environment, comprising:

applying analytics to at least one data storage characteristic observed in the computing storage environment to restructure the deduplicated data in a sequential manner so as to enhance performance of the computing storage environment; and monitoring a type of storage device associated with the deduplicated data, wherein the analytics are withheld from application when the type of storage device is determined to be a solid-state device; wherein:

the at least one data storage characteristic observed in the computing storage environment is at least a read pattern, a data movement characteristic, a block move count characteristic, a read and write throughput characteristic, and a latency characteristic, and restructuring the deduplicated data in the sequential manner is performed by applying the analytics to the read pattern, data movement characteristic, block move count characteristic, read and write throughput characteristic, and latency characteristic, each applied in at least one of a predetermined order, each according at least one of a predetermined weight, and each compared against at least one predetermined threshold to obtain an optimal placement of the deduplicated data in a rearranged, sequential, state; and further wherein one of the at least one predetermined thresholds comprises prohibiting a particular block of the deduplicated data from being restructured when the particular block of deduplicated data has been previously moved in the computing storage environment within a predefined timeframe.

2. The method of claim 1, further including restructuring the deduplicated data in the sequential manner using a background process.

3. The method of claim 1, wherein the at least one data storage characteristic observed in the computing storage environment is a read pattern, and further including performing the restructuring of the deduplicated data in the sequential manner based on analytics applied to the read pattern.

4. The method of claim 1, wherein the at least one data storage characteristic observed in the computing storage environment is a data movement characteristic, and further including performing the restructuring of the deduplicated data in the sequential manner based on analytics applied to the data movement characteristic.

5. The method of claim 1, wherein the at least one data storage characteristic observed in the computing storage environment is a block move count characteristic, and further including performing the restructuring of the deduplicated data in the sequential manner based on analytics applied to the block move count characteristic.

6. The method of claim 1, wherein the at least one data storage characteristic observed in the computing storage environment is at least one of a read and write throughput and latency characteristic, and further including performing the restructuring of the deduplicated data in the sequential manner based on analytics applied to the read and write throughput and latency characteristics.

7. A system for enhancing storage of deduplicated data by a processor device in a computing storage environment, comprising:

a processor device that applies analytics to at least one data storage characteristic observed in the computing storage environment to restructure the deduplicated data in a sequential manner so as to enhance performance of the computing storage environment; and monitors a type of storage device associated with the deduplicated data, wherein the analytics are withheld from application when the type of storage device is determined to be a solid-state device; wherein:

the at least one data storage characteristic observed in the computing storage environment is at least a read pattern, a data movement characteristic, a block move count characteristic, a read and write throughput characteristic, and a latency characteristic, and restructuring the deduplicated data in the sequential manner is performed by applying the analytics to the read pattern, data movement characteristic, block move count characteristic, read and write throughput characteristic, and latency characteristic, each applied in at least one of a predetermined order, each according at least one of a predetermined weight, and each compared against at least one predetermined threshold to obtain an optimal placement of the deduplicated data in a rearranged, sequential, state; and further wherein one of the at least one predetermined thresholds comprises prohibiting a particular block of the deduplicated data from being restructured when the particular block of deduplicated data has been previously moved in the computing storage environment within a predefined timeframe.

8. The system of claim 7, wherein the processor restructures the deduplicated data in the sequential manner using a background process.

9. The system of claim 7, wherein the at least one data storage characteristic observed in the computing storage environment is a read pattern, and further wherein the processor performs the restructuring of the deduplicated data in the sequential manner based on analytics applied to the read pattern.

10. The system of claim 7, wherein the at least one data storage characteristic observed in the computing storage environment is a data movement characteristic, and further wherein the processor performs the restructuring of the deduplicated data in the sequential manner based on analytics applied to the data movement characteristic.

11. The system of claim 7, wherein the at least one data storage characteristic observed in the computing storage environment is a block move count characteristic, and further wherein the processor performs the restructuring of the deduplicated data in the sequential manner based on analytics applied to the block move count characteristic.

12. The system of claim 7, wherein the at least one data storage characteristic observed in the computing storage environment is at least one of a read and write throughput and latency characteristic, and further wherein the processor performs the restructuring of the deduplicated data in the sequential manner based on analytics applied to the read and write throughput and latency characteristics.

13. A computer program product for performing video deduplication by a processor device, the computer program product comprising a non-transitory computer-readable storage medium having computer-readable program code portions stored therein, the computer-readable program code portions comprising:

a first executable portion that applies analytics to at least one data storage characteristic observed in the computing storage environment to restructure the deduplicated data in a sequential manner so as to enhance performance of the computing storage environment; and monitors a type of storage device associated with the deduplicated data, wherein the analytics are withheld from application when the type of storage device is determined to be a solid-state device; wherein:

the at least one data storage characteristic observed in the computing storage environment is at least a read pattern, a data movement characteristic, a block move count characteristic, a read and write throughput characteristic, and a latency characteristic, and restructuring the deduplicated data in the sequential manner is performed by applying the analytics to the read pattern, data movement characteristic, block move count characteristic, read and write throughput characteristic, and latency characteristic, each applied in at least one of a predetermined order, each according at least one of a predetermined weight, and each compared against at least one predetermined threshold to obtain an optimal placement of the deduplicated data in a rearranged, sequential, state; and further wherein one of the at least one predetermined thresholds comprises prohibiting a particular block of the deduplicated data from being restructured when the particular block of deduplicated data has been previously moved in the computing storage environment within a predefined timeframe.

14. The computer program product of claim 13, further including a second executable portion that restructures the deduplicated data in the sequential manner using a background process.

15. The computer program product of claim 13, wherein the at least one data storage characteristic observed in the computing storage environment is a read pattern, and further including a second executable portion that performs the restructuring of the deduplicated data in the sequential manner based on analytics applied to the read pattern.

16. The system of claim 7, wherein the at least one data storage characteristic observed in the computing storage environment is a data movement characteristic, and further including a second executable portion that performs the restructuring of the deduplicated data in the sequential manner based on analytics applied to the data movement characteristic.

17. The system of claim 7, wherein the at least one data storage characteristic observed in the computing storage environment is a block move count characteristic, and further including a second executable portion that performs the restructuring of the deduplicated data in the sequential manner based on analytics applied to the block move count characteristic.

18. The computer program product of claim 13, wherein the at least one data storage characteristic observed in the computing storage environment is at least one of a read and write throughput and latency characteristic, and further including a second executable portion that performs the restructuring of the deduplicated data in the sequential manner based on analytics applied to the read and write throughput and latency characteristics.

* * * * *